United States Patent
Duriez

(10) Patent No.: US 9,701,013 B2
(45) Date of Patent: Jul. 11, 2017

(54) METHOD FOR CONTROLLING A DEFORMABLE ROBOT, AND RELATED MODULE AND COMPUTER PROGRAM

(71) Applicant: Inria Institut National De Recherche En Informatique Et En Automatique, Le Chesnay (FR)

(72) Inventor: Christian Duriez, Villeneuve d'Ascq (FR)

(73) Assignee: Inria Institut National De Recherche En Informatique Et En Automatique, Le Chesnay (FR)

( * ) Notice: Subject to any disclaimer, the term of this patent is extended or adjusted under 35 U.S.C. 154(b) by 14 days.

(21) Appl. No.: 14/766,731

(22) PCT Filed: Feb. 4, 2014

(86) PCT No.: PCT/EP2014/052169
§ 371 (c)(1),
(2) Date: Aug. 7, 2015

(87) PCT Pub. No.: WO2014/122134
PCT Pub. Date: Aug. 14, 2014

(65) Prior Publication Data
US 2015/0360367 A1    Dec. 17, 2015

(30) Foreign Application Priority Data

Feb. 8, 2013 (FR) .................................. 13 51106

(51) Int. Cl.
*G05B 15/00* (2006.01)
*G05B 19/00* (2006.01)
(Continued)

(52) U.S. Cl.
CPC ........... *B25J 9/1607* (2013.01); *B25J 9/0006* (2013.01); *B25J 9/1615* (2013.01); *B25J 9/1635* (2013.01);
(Continued)

(58) Field of Classification Search
USPC ....... 700/245, 263, 275, 262; 73/763; 901/1, 901/47, 9
See application file for complete search history.

(56) References Cited

U.S. PATENT DOCUMENTS

2004/0249319 A1* 12/2004 Dariush ................... A61H 1/00
601/5
2007/0013336 A1* 1/2007 Nowlin .............. A61B 19/2203
318/568.21

(Continued)

OTHER PUBLICATIONS

Duriez, C., et al., "Interactive Simulation of Flexible Needle Insertions Based on Constraint Models", International Conference on Medical Image Computing and Computer Assisted Intervention, London, United Kingdom, 8 pages, 2009.
(Continued)

*Primary Examiner* — Ronnie Mancho
(74) *Attorney, Agent, or Firm* — Maynard, Cooper & Gale, P.C.; Brian Sattizahn

(57) ABSTRACT

The invention relates to a method for controlling a robot (1) defined by a node model and deformable by means of actuators (2). Effector points of the robot must follow a predetermined path. A matrix K defines a change in the inner forces of the robot in each node, on the basis of the change in position of the nodes. Said method includes: updating the K values on the basis of the current position of the nodes of the robot; determining the Jacobian matrix J of the vector δ(x), x being a vector of the position of the nodes and the vector δ(x) comprising respective lines which indicate the coordinates of the gaps between the position of each effector (Continued)

point and the predetermined path thereof, and the movement of each actuator; calculating the values of the matrix $W = J \cdot K^{-1} \cdot J^T$; and solving the equation $\delta = W \cdot \lambda + \delta_0$ and controlling the robot on the basis of said resolution.

13 Claims, 2 Drawing Sheets

(51) Int. Cl.
| | |
|---|---|
| *B25J 9/16* | (2006.01) |
| *B25J 9/00* | (2006.01) |
| *G06F 17/12* | (2006.01) |
| *B25J 15/12* | (2006.01) |
| *B25J 18/06* | (2006.01) |

(52) U.S. Cl.
CPC ............ *B25J 15/12* (2013.01); *B25J 18/06* (2013.01); *G06F 17/12* (2013.01); *G05B 2219/35017* (2013.01); *G05B 2219/40305* (2013.01); *G05B 2219/45117* (2013.01); *Y10S 901/02* (2013.01)

(56) References Cited

U.S. PATENT DOCUMENTS

| | | | | |
|---|---|---|---|---|
| 2007/0146371 | A1* | 6/2007 | Dariush | B25J 9/1602 345/474 |
| 2007/0255454 | A1* | 11/2007 | Dariush | G06N 3/008 700/245 |
| 2010/0228396 | A1* | 9/2010 | Pechev | B25J 9/1607 700/263 |
| 2010/0274087 | A1* | 10/2010 | Diolaiti | A61B 90/37 600/118 |
| 2011/0160906 | A1* | 6/2011 | Orita | B62D 57/032 700/260 |
| 2012/0048027 | A1* | 3/2012 | Hashiguchi | B25J 9/0087 73/763 |
| 2012/0158179 | A1* | 6/2012 | Ooga | B25J 9/1633 700/259 |
| 2012/0259463 | A1* | 10/2012 | Orita | B25J 9/1648 700/245 |
| 2012/0303161 | A1* | 11/2012 | Orita | B25J 9/1607 700/262 |
| 2012/0303162 | A1* | 11/2012 | Orita | B25J 9/1664 700/275 |
| 2014/0081461 | A1* | 3/2014 | Williamson | B25J 9/1643 700/261 |
| 2014/0330432 | A1* | 11/2014 | Simaan | B25J 9/1625 700/250 |
| 2015/0304634 | A1* | 10/2015 | Karvounis | G06T 7/002 348/46 |
| 2016/0236349 | A1* | 8/2016 | Yamane | B25J 9/1664 |

OTHER PUBLICATIONS

Cotin, S., et al., "New Approaches to Catheter Navigation for Interventional Radiology Simulation", Computer Aided Surgery, vol. 11, 8 pages, 2006.

Courtecuisse, Hadrien, et al., "Preconditioner-Based Contact Response and Application to Cataract Surgery", Medical Image, Computing and Computer-Assisted Intervention (MICCAI) Part I, LNCS 6891, pp. 315-322, 2011.

Felippa, C.A., "A Systematic Approach to the Element-Independent Corotational Dynamics of Finite Elements", Center for Aerospace Structures, Report No. CV-CAS-00-03, 44 pages, 2000.

Peterlik, Igor, et al., "Constraint-Based Haptic Rendering of Multirate Complaint Mechanisms", IEEE Transactions on Haptics, vol. 4, No. 3, pp. 175-187, 2011.

* cited by examiner $$\begin{bmatrix} OP_{imp1} - OP_{eff1} \\ \vdots \\ OP_{impm} - OP_{effm} \\ \text{Displacement Act n°1} \\ \vdots \\ \text{Displacement Act n°p} \\ \text{Obstacle constraint n°1} \\ \vdots \\ \text{Obstacle constraint n°n} \end{bmatrix} = \delta(x)$$

METHOD FOR CONTROLLING A DEFORMABLE ROBOT, AND RELATED MODULE AND COMPUTER PROGRAM

The present invention relates to a method for controlling a robot comprising at least one part that can be deformed by a set of actuator(s), each point of a set of point(s), called effecter point(s) of the robot, having to follow a determined trajectory, the robot being defined by a model of nodes and a matrix K defining a variation of the internal forces of the robot at each node as a function of the variation of position of the nodes.

To recap, an actuator is a member of the robot which supplies a load, in the form of a force and/or a pressure and/or a torque, whose intensity is a function of a control that it receives.

The "conventional" controls for controlling a robot are based, generally, on a modeling of the cinematics between the actuator or actuators of the robot and at least one point of the robot at which a determined movement is to be applied, said point being called effecter point of the robot.

This modeling is relatively easy to obtain if the cinematics correspond to an articular chain: the robot is then made up of rigid segments on which articulations (often considered as "perfect") are placed, and possibly encoders to be able to measure the relative movements of these segments. The control computes the configuration of the robot from a relatively simple computation, often analytical, that can be performed in real time.

The existing flexible or deformable robots, i.e. those including at least one part made of flexible or deformable material, are particularly well suited to moving around in fragile environments, for example the human body for surgical robotics. They are also more robust (better resistance to impacts) and can be easier to manufacture (notably by 3D printing).

Most of the flexible or deformable robots that are really used are limited to a small number of degrees of freedom, for example the robots including a flexible clamp, which are used for micro-manipulation. In these conditions, the cinematics remain relatively simple and can, quite simply, be measured, or precomputed.

However, unlike the rigid robots, the number of degrees of freedom of the flexible robots can be infinite, actuators being able to be placed at an infinite number of points, then to be controlled to allow each effecter point to follow the determined movement which is associated with it. However, works being carried out on flexible or deformable multi-actuated robots come up against the problem of their control, notably because of the high number of degrees of freedom of actuation.

Moreover, the finite element methods, or FEM, are used to model the flexible robots when, knowing the commands or loads applied to a flexible robot, when the determination of the behavior of this flexible robot is aimed at.

Even though the computation of the deformation by a FEM model can be done in real time, the difficulty from the point of view of the control, is to obtain the value of the actuation which will generate the desired deformation, so it is a kind of inversion of the model which is therefore needed.

Now, the use of the FEM to solve the inverse problem has not been able to be implemented hitherto because the computation times generally needed are prohibitive.

The present invention aims to contribute to mitigating some of these problems encountered in the driving of the actuators of deformable robots, by proposing an advantageous technique based on an optimized inversion of the FEM model in real time.

To this end, according to a first aspect, the invention proposes a method for controlling a robot of the abovementioned type, characterized in that, to determine the control intended for each actuator on an $i^{th}$ control computation step:

i/ the values of the matrix K are updated as a function of the current position of the nodes of the robot;

ii/ the current values of the Jacobean matrix J of the vector $\delta(x)$ are determined, where x is a position vector of the nodes and the vector $\delta(x)$ includes at least one subset of line(s) relative to each effecter point and indicating the coordinates of the deviations between the position of said effecter point and its determined trajectory, and at least one subset of line(s) indicating the displacement of each actuator;

iii/ the values of the matrix $W = J \cdot K^{-1} \cdot J^T$ are computed, where $K^{-1}$ is the inverse matrix of K and $J^T$ is the transposed matrix of J; and iv/ the equation $\delta = W \cdot \lambda + \delta_0$ is solved, to determine the values of the vectors $\delta$ and $\lambda$ at said $i^{th}$ computation step, where $\lambda$ is a vector including, for each line of the vector $\delta$ relative to an effecter point, a line including a zero value and, for each line of the vector $\delta$ relative to an actuator, a line including a value of load exerted by the actuator corresponding to the indicated displacement, and $\delta_0$ is a vector including determined values; and v/ the control intended for each actuator is deduced as a function at least of values determined in the step iv/ for the vector $\delta$ or $\lambda$.

Such a method makes it possible to drive deformable robots, particularly in the case where several actuators make it possible to drive the deformation of at least one part, consisting of a flexible material, of the robot, in order to create a desired movement on one or more terminal effecter points, while considerably reducing the computation load needed to drive the actuators.

In the embodiments, the method for controlling a robot according to the invention further comprises one or more of the following features:

the vector $\delta$ further includes at least one subset of line(s) indicating a displacement of a point of the robot subject to constraints external to the robot, and the vector $\lambda$ further includes a corresponding subset of line(s) indicating values of forces exerted by the constraints external to the robot corresponding to the indicated displacement;

the position corresponding to the determined trajectory of an effecter point is subtracted from the position of the effecter point determined by interpolation, associated with respective interpolation coefficients, of the position of a set of said node(s) to obtain the subset of lines of the vector $\delta(x)$ relative to the effecter, and wherein, in said same subset of lines of the Jacobean matrix J, the values in the columns which correspond to said nodes are a function of said interpolation coefficients;

a fixing point of an actuator is an interpolation of node(s) each associated with a non-zero interpolation coefficient, and at least one line of the matrix J is determined as a function of the direction of actuation of said actuator, each term of said line being zero apart from those on the columns of said node or of said nodes;

on an $i^{th}$ control computation step:

$\Delta x$ that bears out: $-K \cdot \Delta x = p + f(x_{i-1})$ is determined, where $\Delta x$ represents a variation of the vector x, the vector p represents the external forces being exerted on the robot, K is the matrix updated in the step i/, $x_{i-1}$ is the current position vector of the nodes and $f(x_{i-1})$ is the vector of the internal forces being exerted on the robot in its current position;

$x_{free} = x_{i-1} + \Delta x$ is computed;

the values of the vector $\delta(x_{free})$ are computed; and the equation $\delta = W \cdot \lambda + \delta_0$ is solved in the step iv, by taking $\delta_0$ to be equal to $\delta(x_{free})$.

in the step iii/, the equation $\delta = W \cdot \lambda + \delta_0$ is solved by an iterative algorithm of Gauss-Seidel type, incorporating the constraints linked to the directions of actuation, to limit stop limits and/or to a maximum load exerted by at least one actuator, and/or the characteristics of constraints external to the robot.

According to a second aspect, the present invention proposes a computer program for controlling a robot including at least one part that can be deformed by a set of actuator(s), each point of a set of point(s), called effecter point(s) of the robot, having to follow a determined trajectory, the robot being defined by a model of nodes and a matrix K defining a variation of the internal forces of the robot at each node as a function of the variation of position of the nodes, said program comprising instructions for implementing the steps of a method according to the first aspect of the invention upon an execution of the program by processing means, to determine the control intended for each actuator on an $i^{th}$ control computation step.

According to a third aspect, the present invention proposes a module for controlling a robot comprising at least one part that can be deformed by a set of actuator(s), each point of a set of point(s), called effecter point(s) of the robot, having to follow a determined trajectory, the robot being defined by a model of nodes and a matrix K defining a variation of the internal forces of the robot at each node as a function of the variation of position of the nodes, the control module being characterized in that it is adapted, upon the determination of the control intended for each actuator on an $i^{th}$ control computation step, to update the values of the matrix K as a function of the current position of the nodes of the robot, then to determine the current values of the Jacobean matrix J of the vector $\delta(x)$, where x is a position vector of the nodes and the vector $\delta(x)$ includes at least one subset of line(s) relative to each effecter point and indicating the coordinates of the deviations between the position of said effecter point and its determined trajectory, and at least one subset of line(s) indicating the displacement of each actuator;

said control module being adapted to compute the values of the matrix $W = J \cdot K^{-1} \cdot J^T$, where $K^{-1}$ is the inverse matrix of K and $J^T$ is the transposed matrix of J, and to solve the equation $\delta = W \cdot \lambda + \delta_0$, by determining the values of the vectors $\delta$ and $\lambda$ at said $i^{th}$ computation step, where $\lambda$ is a vector including, for each line of the vector $\delta$ relative to an effecter point, a line including a zero value and, for each line of the vector $\delta$ relative to an actuator, a line including a value of load exerted by the actuator corresponding to the indicated displacement, and $\delta_0$ is a vector including determined values; and said control module being adapted to deduce the control intended for each actuator as a function at least of said determined values of the vector $\delta$ or $\lambda$.

These features and advantages of the invention will become apparent on reading the following description, given purely by way of example, and with reference to the attached drawings, in which:

FIG. 1 schematically represents a multi-actuated deformable robot in an embodiment of the invention;

Figures 3, 4:
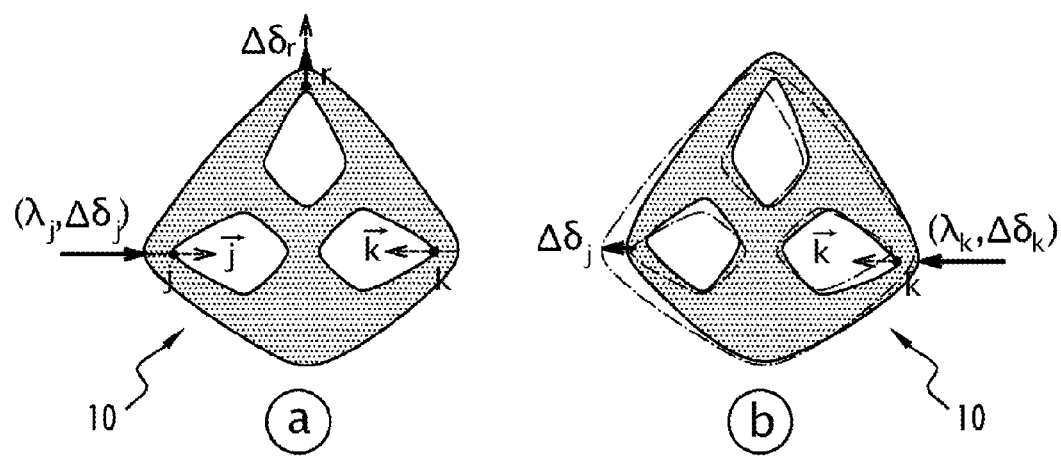
FIG. 3 represents a vector $\delta$.

FIG. 4 comprises two sections 4a and 4b, which represent a deformable robot subject to actuations.

Figure 1:
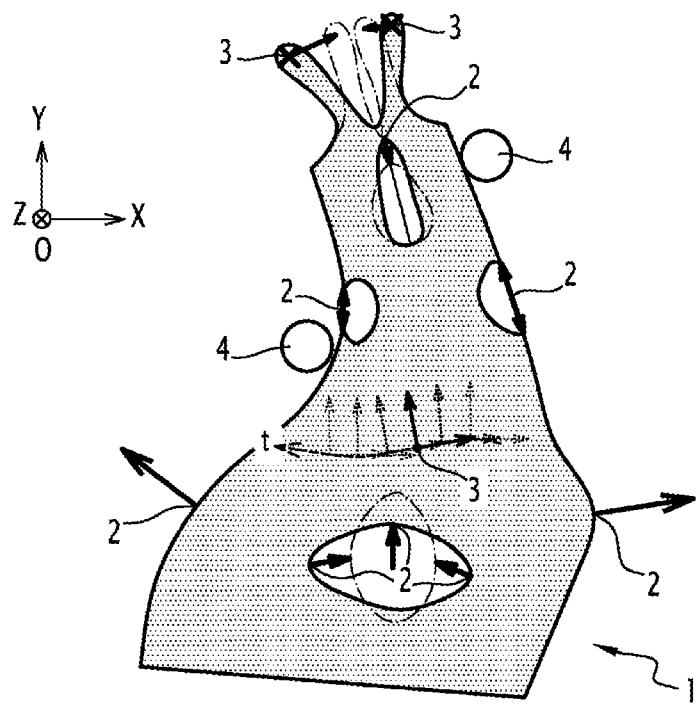

FIG. 1 represents a robot 1 comprising a structure made of deformable material, for example of flexible silicone.

Figure 2:
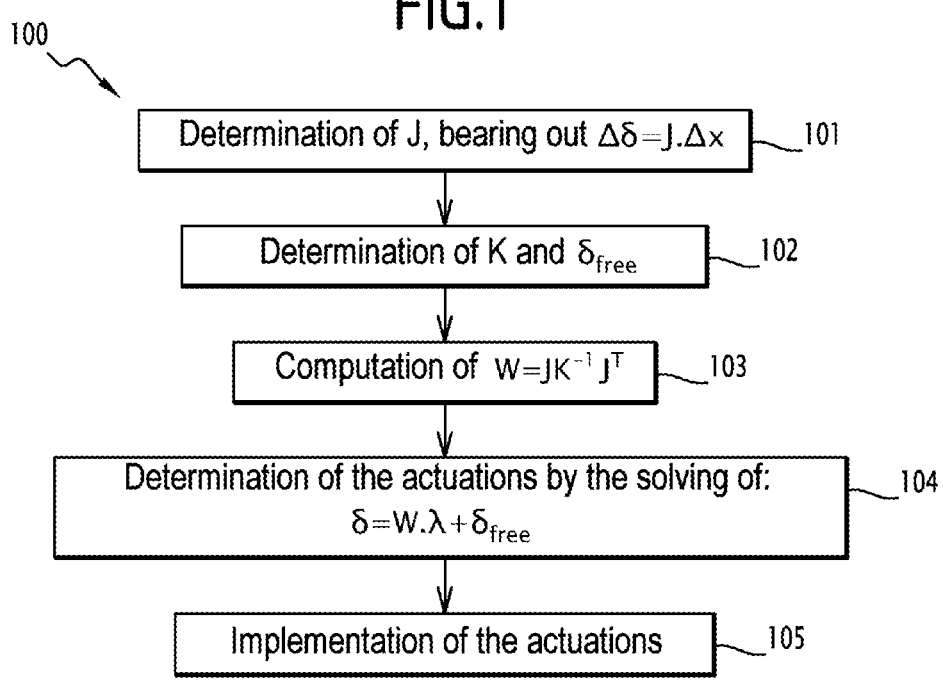
FIG. 2 is a flow diagram of steps of a method in an embodiment of the invention.

The invention proposes a method for controlling the robot 1, iterating a set 100 of steps represented in FIG. 2.

In the case considered, the robot 1 is a robot in 3 dimensions (3D), mobile in 3D, in a space associated with a reference frame, called Ref, associated with a point of origin O and with three axes X, Y, Z.

The robot 1 comprises a number p of actuators 2, conferring a deformation on the robot. The number p can be any number and is chosen, in the example considered, to be equal to eight.

The actuation 1 relative to an actuator can be of various kinds and can comprise, for example:

a rotation or a translation of a part of the structure of the robot by a link on an electric motor, possibly equipped with a reducing gear, and/or a movement obtained by pulling on a cable attached to the structure, at one end, and to a motor equipped with a pulley at the other, and/or one or more elastic pockets inside the structure allowing for an actuation by compressed air or hydraulics, and/or a distributed multi-actuation, by the positioning on the structure of a large number of actuators (for example piezoelectric or by electroactive polymers or by a shape memory material, etc.), which create a local deformation of the structure of the robot.

The load applied by the actuator onto the structure of the robot can comprise a force, a pressure and/or a torque.

Moreover, the robot further comprises m points 3 of the robot 1, called effecter point(s) of the robot, on which a respective trajectory is imposed.

The number m can be any number and is chosen, in the case considered, to be equal to three.

Thus, the effecter point $P_{effj}$, j=1 to m, should be located at an imposed position, corresponding to a point $P_{impj}$, at an $i^{th}$ step of iteration of the method for controlling the robot. Its imposed trajectory can be modified at any time, notably in the context of a real-time application.

In one embodiment, the environment of mobility of the robot 1 comprises a number n of obstacles 4. The number n can be any number and is chosen, in the case considered, to be equal to two. These obstacles can be static (i.e. not move within the reference frame) or dynamic, with a known behavior.

There is a model of the mechanical interaction between the obstacles 4 and the robot 1 which is, for example, of contact, rail link, flat bearing or other such type. This modeling will notably be used to adapt the control of the robot as a function of the obstacles.

The deformable robot 1 is defined by a model comprising a set of nodes and by an associated tangential matrix K, called stiffness matrix, defining the internal forces at each node as a function of the positions of the nodes, which make it possible to model the deformations, notably nonlinear, of the robot.

In the present case, the robot 1 is modeled by a finite element model, or FEM, associated with a meshing of N nodes (see in particular C. Felippa, "A systematic approach to the element-independent corotational dynamics of finite elements", Technical Report, Center for Aerospace Structures, 2000).

Any other method making it possible to define a physical model of the deformation of the robot 1 can be used instead, for example a formulation of "meshless" type, a Galerkine method, an XFEM method, etc.

According to the invention, referring to FIG. 2, an iterative method 100 is implemented to determine, at the end of each iteration step, the content of the control of each actuator of the robot 1 allowing the effecter points to follow to the best the desired trajectories, while taking into account the obstacles.

In one embodiment, this iterative method 100 is implemented by a driver module of the robot 1.

In one embodiment, this driver module of the robot comprises a memory and a microprocessor. Data, for example defining the FEM model, the trajectories of the effecters and the obstacles, and software instructions, are stored in this memory.

Also, the steps of the method 100 as described below are implemented by the driver module of the robot, when the software instructions stored in the memory are executed on the microprocessor.

Thus, at an $i^{th}$ iteration step of the method 100 in one embodiment of the invention the following steps 101 to 105 are implemented.

Take x to be the vector comprising the coordinates of the N points. $x_{i-1}$ will denote the vector which comprises the current coordinates of the N points defining the robot, at the end of the implementation of the actuations determined in the iteration i−1 of the method 100.

Thus, in a step 101, this vector $x_{i-1}$ of known values is considered, which defines the position of the robot 1 as obtained at the end of the iteration i−1 of the method 100, the coordinates having been measured (closed loop mode determination), or estimated (open loop mode determination) from the model and the actuations determined in the iteration i−1.

The vector $x_i$ will similarly comprise the coordinates of the N points defining the robot at the end of the current iteration i of the method 100, once the actuations which will be determined in this iteration i have been implemented.

The current position of the n obstacles, the current position of the p actuators and the imposed position $P_{impj}$ desired for each of the m effecter points are determined.

A degree of freedom is a possible mobility (authorized or not) in the space considered. Each node of the robot has a certain number of degrees of freedom (for example translation on one to three orthogonal axes and/or rotations on one or more of the axes). The total number of degrees of freedom of a deformable object is therefore the number of degrees of freedom per node*N.

The notion of degree of freedom applies also for the effecter points and for the actuators, as well as the mechanical links, or constraints, linked to the obstacles.

For an effecter point, it relates to the number of controlled mobilities (for example, if the position of an effecter point is controlled, there are 3 degrees of freedom, therefore 3 lines corresponding to this effecter point in δ-, whereas, if, additional 3 orientations are controlled, that makes 6 degrees of freedom in total in δ for this effecter point).

For each actuator, in general, there is only one degree of freedom (for example, a translation or a rotation). However, there can be combined actuators (a translation+a rotation). In this case the actuator will have 2 degrees of freedom.

For each obstacle, the number of degrees of freedom eliminated is considered: for example, a point on a plane is constrained only in one direction (the other two remain free), therefore the constraint has one degree of freedom. On the other hand, constraining a point to follow a line or a curve requires a constraint with 2 degrees of freedom. For more complex links, including translation and rotation, there can be up to 6 degrees of freedom eliminated.

Now consider the vector δ(x), a nonlinear function of the vector x.

δ comprises lines relative to the effecter points which will indicate, for each effecter point considered in succession at the end of the iteration i, the coordinates of the deviation between the trajectory point imposed for this effecter point and the position of this effecter point at the end of the iteration i.

In the case considered, for each effecter point, there is a line in δ for each degree of freedom of the effecter point.

The effecter points are considered as points interpolated from the position of the N nodes given by $x_i$.

With m effecter points, there will have to be 3*m lines in δ to control the position of these two effecter points with 3 degrees of freedom each in translation relative to the axes X, Y, Z, or 6*m lines to control the position and the orientation of these m effecter points with 6 degrees of freedom each.

The vector δ(x) then comprises lines which will indicate, for each actuator considered in succession, the displacement of the actuated zone in the direction of actuation as a function of the position of the nodes interpolating the actuated zone and of the possible modification of the direction of the actuation (in effect, when the structure of the robot is deformed and a cable is used to pull on a zone, the direction of the cable changes).

It will be noted that when the actuator is of pneumatic or hydraulic type, the displacement of the actuated zone indicates a variation of volume.

In the case considered, for each actuator, there is a line in δ for each degree of freedom of the actuation.

The vector δ(x) finally comprises lines which will indicate, for each obstacle considered in succession, the constraint associated with the obstacle in the zone concerned of the robot (for example the displacement of a point of the robot subject to this obstacle as interpolation of the position of the N nodes given by $x_i$).

In the case considered, for each obstacle, there is a line in δ for each degree of freedom possibly eliminated by the obstacle. For example, a contact of a point with a plane can eliminate a degree of freedom in a direction normal to the plane if the point considered touches the plane (otherwise, it eliminates nothing): it will be stated in this case that the constraint is active and eliminates a degree of freedom; otherwise, it eliminates nothing.

The vector δ(x) is therefore a function of the space $R^N$ to the space $R^M$, where M is equal to the sum of the degrees of freedom aggregated for the m effecter points, of the degrees of freedom aggregated for the p actuators and of the degrees of freedom aggregated for the n obstacles.

Now consider the matrix J, which is the Jacobean matrix, relative to x, of the vector δ(x).

This matrix J thus makes it possible to write a variation of the vector δ(x) as a function of a variation of the vector x linearly:

$$\Delta\delta(x)=J\cdot\Delta x \qquad \text{equation (1)}$$

The variations considered are for example those between the iterations i−1 and i; thus $\Delta x = x_i - x_{i-1}$. Thus, the values in Δδ relative to the actuators indicate the displacements of the actuators during this variation Δx, that is to say between iterations i−1 and i.

Consider also the vector λ(x), of the same size M as the vector δ, each line of λ corresponding to a line of δ. Thus, the line n·k of δ relates to the same degree of freedom of the same effecter point or of the same actuator or of the same obstacle, as that to which the line n·k of λ relates.

In λ, all the lines corresponding to the effecter points have a zero value.

On each line for which, in δ, there will be indicated an actuator displacement, the intensity of the corresponding load (force, pressure, torque) exerted by the actuator on the robot 1 will be included in λ.

On each line for which, in δ, there is indicated an obstacle constraint, the intensity of the corresponding load exerted by the obstacle on the robot 1 corresponding to the degree of freedom considered on this line will be included in λ.

The processing operations performed during the iteration i of the method 100 will make it possible to determine the values of the vectors δ and λ, and thereby know the actuation values to be ordered of the actuators.

The values taken by the matrix J are now determined.

It is considered that J is constant during an iteration.

The variations of δ during an iteration are determined by equation (1).

This matrix J comprises a number M of lines equal to the number of lines of δ, and a number of columns equal to 3N in the case considered (6N in the case where 6 degrees of freedom are considered for the nodes).

Thus, the line n·k of J relates to the same degree of freedom of the same effecter point or of the same actuator or of the same obstacle as that to which the line n·k of δ relates.

Thus, for each line of δ relative to a degree of freedom of an effecter point, there is a corresponding line in the Jacobean matrix J.

If the effecter point is a node of the model, then the line of the matrix J which is associated with it for a given degree of freedom, that is to say on the axis X, Y or Z, is filled with 0 except for the coordinate relative to this axis (or even according to a rotation rX, rY, rZ about the axis on the axis X, Y or Z), of the node on this line for this node, where the value is 1.

If the effecter point does not correspond to a node, but to a point placed in an element of the meshing between a plurality of nodes, that is to say that it results from a function of interpolation of these nodes, this interpolation function is used to construct the lines of the matrix J relative to this effecter point (see in particular C. Duriez, C. Guebert, M. Marchal, S. Cotin, and L. Grisoni, "Interactive simulation of flexible needle insertions based on constraint models", International Conference on Medical Image Computing and Computer Assisted Intervention, London, United Kingdom, 2009, pp. 291-299; http://hal.inria.fr/inria-00540334). For each line corresponding to a respective degree of freedom, there is then a non-zero value only at these nodes and the values used correspond to the weight associated with this node in the interpolation function.

Similarly, each line of δ relative to a degree of freedom of an actuator or of an obstacle has a corresponding line in the Jacobean matrix J.

For example, if the actuator chosen is a cable, the direction d in which the cable pulls (corresponding to the direction of displacement of this actuator, i.e. or even to the degree of freedom of the cable), is stored in this line of the matrix J, by choosing the columns which correspond to the node(s) to which the cable is attached.

If a line of δ corresponding to the displacement of a cable in the direction of actuation and to a point of actuation on the structure of the robot is derived, then, in the matrix J, on the line corresponding to this actuation point for the direction of actuation, there are obtained:

0s for all the columns corresponding to nodes which do not directly interpolate the actuation point, non-zero values for all the columns which correspond to nodes which directly interpolate the actuation point. In each of the columns according to X, Y and Z of a node, there is the (unitary) direction of actuation multiplied by the weight of the node in the interpolation.

For example:

⇒if the actuation point P results from the following interpolation: $P = \alpha \cdot N_a + \beta \cdot N_b + \gamma \cdot N_c$ where $N_a$, $N_b$ and $N_c$ are the respective positions, in (O, X, Y, Z) in the present case of three of the N nodes, and α, β and γ are the weights of the interpolation with the norm of α, β and γ lying between 0 and 1 and the sum of α, β and γ is equal to 1, and if the direction of actuation is indicated by the unitary vector $$d = \begin{bmatrix} d_x \\ d_y \\ d_z \end{bmatrix}$$

then the corresponding line of $J = [0 \ 0 \ \ldots \ 0 \ \alpha^* d_x \ \alpha^* d_y \ \alpha^* d_z \ 0 \ 0 \ \ldots \ 0 \ \beta^* d_x \ \beta^* d_y \ \beta^* d_z \ 0 \ 0 \ \ldots \ 0 \ \gamma d_x \ \gamma d_y \ \gamma d_z \ 0 \ 0 \ \ldots \ 0]$, where $\alpha^* d_x$, respectively $\alpha^* d_y$, respectively $\alpha^* d_z$ is the term of the line considered in the column relative to the axis X, respectively Y, respectively Z of the node considered of position $N_a$; $\beta^* d_x$, respectively $\beta^* d_y$, respectively $\beta^* d_z$ is the term in the column relative to the axis X, respectively Y, respectively Z of the node considered of position $N_b$ and $z^* d_x$, $z^* d_y$, $z^* d_z$ is the term in the column relative to the axis X, respectively Y, respectively Z of the node considered of position $N_c$.

For a pressure actuator, the meshing elements, for example triangles, which inflate or deflate with pressure, are selected. If the pressure is uniform in the cavity, all of the triangles concerned contribute to the same line on the matrix J by using the normal to the triangle and a weighting proportional to the area of the triangle. In the construction of J, this corresponds to a conventional way of imposing a pressure constraint on a finite element model. In this case, the line of δ corresponding to this actuator contains a value of the volume of the cavity on the line corresponding to the constraint, and the corresponding line of λ will contain the pressure value used.

Thus, generally, a fixing point of an actuator is an interpolation of node(s) each associated with a non-zero interpolation coefficient, and the direction of displacement of the actuator is indicated in the line of the matrix J, each term of said line being zero apart from those of said node or of said nodes.

For the interactions of the robot with the obstacles of the external environment, it is possible to use different types of constraints as described in the articles like "Interactive simulation of flexible needle insertions based on constraint models" mentioned above to simulate the insertion of the robot into a deformable medium, or I. Peterlik, M. Nouicer, C. Duriez, S. Cotin, and A. Kheddar, "Constraint-based haptic rendering of multirate compliant mechanisms", IEEE Trans. Haptics, vol. 4, no. 3, pp. 175-187, July 2011, http://dx.doi.org/10.1109/TOH.2011.41) for a more generic formalism, included in response to a collision.

For an obstacle, as indicated above, each line relative to the obstacle of the vector δ corresponds to a degree of freedom possibly eliminated by the obstacle.

For example, in the case of a point/plane contact, the value indicated in δ for this line measures the distance from the point to the plane: if this value of δ is positive, the constraint is deactivated; if the value becomes negative, the constraint is activated to return to a value equal to 0.

Similarly, for an obstacle, each corresponding line of the matrix J corresponds to the movement of the degree or degrees of freedom possibly eliminated by the obstacle as a function of the movement of the nodes.

For the same example of the point/plane contact, to construct the line considered of J, 2 information items will be used as a basis:

the interpolation of the movement of the point P: (for example) $P = \alpha \cdot N_a + \beta \cdot N_b + \gamma \cdot N_c$, where $N_a$, $N_b$ and $N_c$ are the respective positions of three of the N nodes, and α, β and γ are the weights of the interpolation with the norm of α, β and γ lying between 0 and 1 and the sum of α, β and γ is equal to 1 the direction normal to the plane indicated by the unitary vector n:

$$n = \begin{bmatrix} n_x \\ n_y \\ n_z \end{bmatrix}$$

Then the corresponding line of J=[0 0 ... 0 α*$n_x$ α*$n_y$ α*$n_z$ 0 0 ... 0 β*$n_x$ β*$n_y$ β*$n_z$ 0 0 ... 0 γ*$n_x$ γ*$n_y$ γ*$n_z$ 0 0 ... 0], where α*$n_x$, respectively α*$n_y$, respectively α*$n_z$ is the term of the line considered, in the column relative to the axis X, respectively Y, respectively Z of the node considered of position $N_a$; β*$n_x$, respectively β*$n_y$, respectively β*$n_z$ is the term in the column relative to the axis X, respectively Y, respectively Z of the node considered of position $N_b$ and z*$n_x$, z*$n_y$, z*$n_z$ is the term in the column relative to the axis X, respectively Y, respectively Z of the node considered of position $N_c$.

Whatever the determination method, the Jacobean matrix J, once constructed, is largely filled with zero values. It is therefore possible to store it by using a hollow matrix format.

To take account of the extensive transformations of the deformable robot, generated by the controls, the finite element model used is nonlinear.

On the other hand, a linearization of this model is performed on each iteration i, which makes it possible to compute a tangential matrix K(x)=df/dx.

If a dynamic finite element model is used, an implicit or semi-implicit integration method will be used which requires the computation of the tangential matrix of the nonlinear model.

In the case considered, a static finite element model is used, which computes the vector f of the internal forces as a function of the position vector x of the nodes.

In a step 102, the values of the tangential matrix K of stiffness, defining the internal forces at each node as a function of the positions of the N nodes, are re-updated as a function of the d determined current positions $x_{i-1}$ of these N nodes.

The duly updated matrix K is denoted $K(x_{i-1})$.

In the case considered, the size of K is 3N*3N.

A linearization of the internal forces is then computed on the basis of the position $x_{i-1}$ of the nodes:

$$f(x_i) \approx f(x_{i-1}) + K(x_{i-1}) \cdot \Delta x \qquad \text{equation (2)}$$

with $\Delta x = x_i - x_{i-1}$.

To establish the static equilibrium (the sum of the forces external and internal to the robot 1 is equal to zero over all of the nodes) at the current iteration i, the result is the equation:

$$-K(x_{i-1}) \cdot \Delta x = p + f(x_{i-1}) + J^T \lambda \qquad \text{equation (3)}$$

where the vector p represents the known external forces, comprising, for example, gravity, and $J^T \lambda$ combines the contributions of all the constraints taken into account according to the invention (i.e. those relative to the effecter points, actuators and mechanical interactions with the external environment).

The matrix J is the one computed in the step 101 and the current values of the vector λ are to be determined.

The free configuration of the robot 1 is then computed, corresponding to the solving of the equation 3 of the model of the robot with the vector λ equal to the zero vector.

The duly determined corresponding position is $x_{free} = + \Delta x_{free}$.

The matrix K is very hollow. To solve the system formed by this matrix, it is possible to use a conjugate gradient and a direct method with factorization, for example of $LDL^T$ type.

For example, for a meshing of the robot 1 made up of 1000 nodes and of 3000 tetrahedral elements, it is possible to obtain a refresh rate of 60 Hz, which is compatible with the real-time control of a robot.

To use more complex meshing $LDL^T$ factorization can be desynchronized and the so-called "warping" technique can be used (see for example H. Courtecuisse, J. Allard, C. Duriez, and S. Cotin, "Preconditioner-based contact response and application to cataract surgery", Medical Image, Computing and Computer-Assisted Intervention (MICCAI), 2011, http://www.lifl.fr/~courtecu/).

From this resultant position $x_{free}$ (which would correspond to the absence of actuation and of obstacle) and from the equation 1, the value of the vector $\delta_{free} = \delta(x_{free}) = J \cdot \Delta x_{free}$ is determined.

In this step 102, the values of the matrix K are updated as a function of the current position of the nodes of the robot and of the chosen deformation model: FEM model or other model based on physics. In effect, if a dynamic model and an implicit temporal integration scheme have been chosen, K also contains a linearization of the inertial forces in a sum weighted with the linearization of the internal forces: the weighting then depends on the integration scheme and on the chosen time step. In all cases, it is assumed that a single value of K is used for each step of computation of the control.

In a step 103, a so-called reduced compliance matrix W is computed which makes it possible to work in a space of reduced dimension, with $W = J \cdot K^{-1} J^T$, where J is the matrix determined in the step 101, $J^T$ is its transposed matrix and $K^{-1}$ is the inverse of the matrix K obtained in the step 102.

From the computation of the free configuration as described above, a new formulation is obtained describing the variation of the vector δ:

$$\delta = W \cdot \lambda + \delta_{free} \qquad \text{equation (4)}.$$

The formulation of the determination of the controls of the robot 1 in the form of the equation (4) shows that the size of the system to be solved corresponds to the size of the matrix W, which is equal to M, the size of the vector δ, that is to say to the addition of the number of degrees of freedom of the effecter points, of the actuators and of the obstacles. In other words, for a robot controlled in position on two effecter points (corresponding in total to 6 degrees of freedom), by 10 actuators (corresponding in total to 10 degrees of freedom) with 5 points of contact (corresponding in total to 5 degrees of freedom), a system of size 21 is obtained. By contrast, in the prior art, the sizes of the systems to be solved correspond to the size of the vector x, that is to say to the number N of nodes used by the finite elements model multiplied by the number of degrees of freedom per node, which, for meshing of average size, that can be used in real time, corresponds to systems of a size of between 1000 and 3000.

To allow for an effective computation of the inverse of K, certain factorization methods can be used in real time for the meshing of reduced size (approximately 300 nodes with 3 degrees of freedom). For the linear robot structures for which the matrix K can be placed in the form of a three-diagonal block matrix, the computation can be done with a dedicated solver as in C. Duriez, S. Cotin, J. Lenoir, and P. F. Neumann, "New approaches to catheter navigation for interventional radiology simulation", Computer Aided Surgery, vol. 11, pp. 300-308, 2006. Generally, a very good approximation of the matrix W can be used by using the method described in the article mentioned above "Preconditioner-based contact response and application to cataract surgery", which relies on an algorithm suited to a graphic processor unit GPU.

By using the compliance matrix $W=[w_{rj}]_{r,j}$, it is possible to know the mechanical coupling between an effecter point r and an actuator point j of the structure. More specifically, it is possible to have an estimation of the displacement $\Delta\delta_r$, created on an effecter point r over a degree of freedom (corresponding to a variation of the difference between the actual position of the effecter point and its desired position on this degree of freedom), stored on the line r of the matrix J) as a function of the load $\lambda_j$ (force, pressure or torque), applied by the actuator j, on the structure and for which the direction of the constraint is stored on the line j of the matrix J: the following is obtained: $\Delta\delta_r = w_{rj}\lambda_j$.

To simplify, hereinbelow, this effecter point associated with the line r of the matrix J is called "effecter r" and this actuator associated with the line j of the matrix J is called "actuator j".

The cinematic link between the position of the actuator j and the position of the effecter r is supplied by $\Delta\delta_r = \Delta\delta_j \cdot w_{rj}/w_{jj}$, where $\Delta\delta_j$ is a variation of position of the actuator j (in the direction of actuation) and $\Delta\delta_r$ is a variation of position of the effecter r. If the effecter has several degrees of freedom, $\Delta\delta_r$ and $w_{rj}$ have as many lines as degrees of freedom.

Another actuator, associated with the line k of the matrix J and hereinafter called "actuator k" can also influence the displacement of the actuator j, and vice versa.

This mechanical coupling can also be known using the matrix W: the corresponding variation of displacement, on the degree of freedom of the actuator j, is $\Delta\delta_j = w_{j,k}\lambda_k = \delta_k \cdot w_{jk}/w_{kk}$.

FIGS. 4a and 4b illustrate these cinematic links, and represent how an actuation ($\lambda_j$, $\delta_j$) of the actuator j along the direction $\vec{j}$ can be controlled so as to impose a displacement $\Delta\delta_r$ on the terminal effecter r (FIG. 4a). Another actuation ($\lambda_k$, $\delta_k$) of the actuator k along the direction $\vec{k}$ can create an undesired displacement $\Delta\delta_j$ on the actuator j (FIG. 4b).

In a step 104, the actuation controls will be determined as a function of the matrix W, of the knowledge of the position $x_{i-1}$ of the effecter points and of their desired trajectory at the end of the iteration i, of the position of the actuators and of all of the constraints linked to the environment.

Considering the terms $\delta_r(x)$ of the $r^{th}$ lines of the vector $\delta$ relative to the effecter points (r in the example considered being equal to 3*m=3*2), indicating the distances between their real and desired positions in the different directions X, Y, Z of the space, the aim of the algorithm detailed below is to identify a position (corresponding to an actuation load) on the actuators (stored on the lines of $\delta$ for the actuation position and on the lines of $\lambda$ for the actuation load) such that the robot is deformed so as to arrive at $\delta_r(x_i)=0$.

Among the algorithms that can be used to perform this computation, an iterative solver of Gauss-Seidel type is chosen here. The iterations of this algorithm are stopped once the solution stabilizes, the variation between two iterations of the determined solution then having to be below a fixed threshold.

On each iteration "it", the algorithm updates, one by one, the contributions $\lambda_j$ of the actuators j, while freezing the contributions $\lambda_k$ of the other actuators at their current value, to take account of the coupling between the actuators, on the basis of this equation:

$$\delta_j - w_{jj}\lambda_j^{it} = \sum_{k=0}^{j-1} w_{jk}\lambda_k^{it} + \sum_{k=j+1}^{p} w_{jk}\lambda_k^{it-1} + \delta_{free,j} \qquad \text{equation (5)}$$

where $\delta_j$ is the term of the line of the vector $\delta$ relative to the actuator j, $\lambda_k^{it}$ is the term of the line of the vector $\lambda$ relative to the actuator k as determined in the iteration it-1, p is the number of actuators, $\delta_{free,j}$ is the term of the line of the vector $\delta_{free}$ relative to the actuator j.

Since an algorithm of Gauss-Seidel type is used, when a local updating of the actuator j is performed, the frozen contributions of the actions 0, ... j−1 come from the current iteration it whereas the frozen contributions of the actuators j, ... , p, come from the preceding iteration it−1. The local updating of the actuator j gives a new contribution $\lambda_j^{it}$, and a new position of the effecter point $\delta_r$ in the direction r is updated by using:

$$\delta_r += w_{rj}(\lambda_j^{it} - \lambda_j^{it-1}) = w_{rj}\Delta\lambda_j,$$

where $\Delta\lambda_j$ represents the variation of the load $\lambda_j$ exerted by the actuator j following the local updating of the actuator j.

Thus, during the updating of the actuator j, it is possible to assess how the actuator may or may not reduce the value of $\delta_r$.

When this updating is performed in 3D, r is taken successively to be equal to X, Y, Z for an effecter point considered, thus successively giving the values $\delta_X$, $\delta_Y$, $\delta_Z$. By imposing the variation of $\lambda_j$, a movement is created on this effecter point:

$$\begin{bmatrix} \delta_X \\ \delta_Y \\ \delta_Z \end{bmatrix} += \begin{bmatrix} w_{Xj} \\ w_{Yj} \\ w_{Zj} \end{bmatrix} \Delta\lambda_j$$

where $w_{Xj}$, respectively $w_{Yj}$, respectively $w_{Zj}$ are the terms of the matrix W on the line associated with the effecter point considered for the direction X, respectively Y, respectively Z and on the column associated with the actuator j.

The vector $$\begin{bmatrix} \delta_X \\ \delta_Y \\ \delta_Z \end{bmatrix}$$

is called δ*, and the vector $$\begin{bmatrix} w_{Xj} \\ w_{Yj} \\ w_{Zj} \end{bmatrix}$$

is called w*.

On each iteration it and on each passage over an actuator j, the aim is therefore to reduce the distance between the actual position and the desired position for the effecter point considered, measured by δ*. However, the actuator j creates movement on the effecter point only in the direction given by the vector w*.

Consequently, a new value of $\Delta\lambda_j$ is sought, such that:

$$(w_{*j}\Delta\lambda_j) \cdot \left(\frac{w_{*j}}{\|w_{*j}\|}\right) = -\delta_* \cdot \left(\frac{w_{*j}}{\|w_{*j}\|}\right)$$

This value is obtained by using:

$$\Delta\lambda_j = -(w_{Xj}\Delta\delta_x + w_{Yj}\Delta\delta_y + w_{Zj}\Delta\delta_z)/\|w^*\|^2 \qquad \text{equation (6)}$$

where $\Delta\delta_X$, $\Delta\delta_Y$ and $\Delta\delta_Z$ respectively represent the variation of $\delta_X$, $\delta_Y$ and $\delta_Z$.

The equation 6 makes it possible to determine the variation of the load exerted by an actuator in order to best correct the deviation between real and desired positions of an effecter point.

Given this new value of $\Delta\lambda_j$, it is possible to update $\lambda_j^{it}$ and the position $\delta_j$ of the actuator j by using the equation (5).

If the updated position of the actuator j exceeds a limit stop that has been associated with the actuator j or if the value $\lambda_j$ of the actuation load of the actuator j exceeds the capacities of the actuator, the actuation is then limited to respect these constraints.

The inclusion of the constraints linked to the actuators has been described above. To take account of the self-collisions of the robot, of the contacts or other constraints with the environment, it is sufficient for that to add a line in the system considered for each additional constraint. On each iteration it, once the constraints linked to the actuators have been updated, the lines corresponding to these other constraints are updated. For a contact constraint, Signorini's law is for example imposed: upon a contact j, $\delta_j^{it}$ is first computed by using the equation (5). Then, $\Delta\lambda_j = -\delta_j^{it}/w_{jj}$ is computed. Then, if, and only if, $\lambda_j^{it} < 0$, the unilateral constraint is enforced by imposing $\lambda_j^{it} = 0$. Other types of constraint, for example needle insertion, can be computed with other types of equations (see in particular the document "Interactive simulation of flexible needle insertions based on constraint models" already cited).

Once the algorithm has converged, a vector Δ is obtained which gives the contributions to be produced by the actuators taking into account the obstacle constraints, and the corresponding vector δ.

The Gauss-Seidel algorithm making it possible to carry out a check with redundant actuation is just one of the algorithms that can be used. Other algorithms can be used so as to determine a load/a pressure to be applied to the actuators to obtain the desired trajectory of the effecter points.

In a step 105, the controls indicating the contributions to be supplied by the actuators are supplied thereto, the actuators then implementing their respective control. If the actuator is controlled in position, the control is a function of the value in each line of δ associated with the actuator. If the actuator is controlled in load, the control is a function of the value in each line of δ associated with the actuator.

The coordinates of the N nodes of the robot 1 in the configuration resulting from these actuations are then determined, for example by measurements, then stored in the vector $x_i$.

In another embodiment, the coordinates of the N nodes of the robot 1 in the configuration resulting from these actuations are determined using:

$$x_i = x_{free} + K^{-1}J^T\lambda.$$

The present invention thus makes it possible in real time to control a deformable robot by a set of actuator(s) making it possible to obtain a desired trajectory of at least one terminal effecter of the robot, by virtue notably of the use of a finite element method, and to do so even when this set of actuators comprises a very large number of actuators.

In one embodiment, the lines relative to the compatible actuation zones (i.e. those which create similar displacement on a terminal effecter) are combined in the compliance matrix to simplify the computation of the real-time control.

In the case considered, the determination of the controls took into account the presence of obstacles present around the robot. Nevertheless, the invention can be implemented without obstacles being taken into account. In this case, the matrices and vectors considered do not include any lines relative to the obstacles.

In the case considered, the deformable robot comprised a deformable 3-dimensional (3D) structure. Nevertheless, the invention is applicable for any 1 D, 2D or 3D deformable robot geometry according to any number of dimensions. For example, the robot can correspond to a 1D structure, for example of actuated flexible tube type or a 2D structure, for example an actuated plate of small thickness.

It will be noted that, in the equation (4), $\delta_{free}$ is used as reference value for the vector. In other embodiments, it would be possible to take into account the vectors δ and λ computed in the preceding iteration and predictively determine the values of these vectors for the current iteration using the equations 3 and 4, as is presented in sections 3.2 and 3.4 of the article by Peterlik, I.; Nouicer, M.; Duriez, C.; Cotin, S. & Kheddar, A. "Constraint-Based Haptic Rendering of Multirate Compliant Mechanisms" IEEE Trans. Haptics, IEEE Computer Society Press, 2011, 4, 175-187.

Thus, according to the invention, any type of constraint can be taken into account, external (obstacles, etc.), or internal to the robot (limit stop of the actuators for example, a local rigidification or, on the contrary, a softening of certain parts of the structure which can consist of a material whose mechanical properties are controllable), the internal contacts (active: an actuator comes to create a contact between two parts of the structure, or passive: the deformation creates contacts internal to the structure) can be used to optimize the effectiveness of the structure. It is the computation of the reduced compliance matrix according to the invention, incorporating lines relative to these constraints, which makes it possible to drive the modification of the behavior of the structure.

The model of mechanical interaction between an obstacle 4 and the robot 1 is used for the construction of the vector δ (and therefore, consequently, for the matrix J and the matrix W). It is also used in the algorithm which computes the positions of the robot in the step 105.

The applications of the invention are very wide-ranging and the spectrum of use encompasses notably that of robotics, for example in the following fields.

Surgical robotics or surgical in a fragile environment: a flexible robot offers a number of advantages. It can first of all be produced "of a single block", which avoids the use of material that is not compatible with imaging. Furthermore, in surgery, one of the constraints is that the robot must not injure the patient: it is therefore advantageous to have a robot that is capable of being deformed when it comes into contact with the anatomy of the patient.

Medical robotics: for the creation of functional orthosis (cyberthosis), it is advantageous not to have a rigid robot exoskeleton, particularly awkward because the cinematics of the articulations are difficult to follow for articulated orthoses. The proposed approach makes it possible to use flexible exoskeletons which adapt to the morphology of the patient and which optimize the actuation according to the anatomy and the situation.

Exoskeletons: for the same reasons as those explained above, it can be advantageous to use a flexible exoskeleton.

Biomimetic robotics: for the creation of robots approximating to the human or animal anatomy, it is advantageous to be able to drive deformable structures to mimic the role of the muscles.

In one embodiment, the robot can include at least one rigid part and at least one deformable part: for example, the robot can include a rigid arm and a flexible needle held by the rigid arm, the robot having to insert the needle into soft tissues.

The invention claimed is:

1. A method for controlling a robot comprising at least one part that can be deformed by a set of actuators, each point of a set of points, called effecter points of the robot, having to follow a determined trajectory, the robot being defined by a model of nodes and a matrix K defining a variation of internal forces of the robot at each node as a function of a variation of position of the nodes, the method being characterized in that, to determine a control intended for each actuator on an $i^{th}$ control computation step:
   i/ values of the matrix K are updated as a function of a current position of the nodes of the robot;
   ii/ current values of a Jacobean matrix J of a vector δ(x) are determined, where x is a position vector of the nodes and the vector δ(x) includes at least one subset of lines relative to each effecter point and indicating coordinates of deviations between a position of said effecter point and its determined trajectory, and at least one subset of lines indicating a displacement of each actuator;
   iii/ values of a matrix $W=J \cdot K^{-1} \cdot J^T$ are computed, where $K^{-1}$ is an inverse matrix of K and $J^T$ is a transposed matrix of J; and
   iv/ an equation $\delta = W \cdot \lambda + \delta_0$ is solved, to determine values of the vectors δ and λ at said $i^{th}$ computation step, where λ is a vector including, for each line of the vector δ relative to an effecter point, a line including a zero value and, for each line of the vector δ relative to an actuator, a line including a value of load exerted by the actuator corresponding to an indicated displacement, and $\delta_0$ is a vector including determined values; and
   v/ a control command intended for each actuator is deduced as a function at least of values determined in the step iv/ for the vector δ or λ.

2. The method for controlling a robot as claimed in claim 1, wherein the vector δ further includes at least one subset of lines indicating a displacement of a point of the robot subject to constraints external to the robot, and the vector λ further includes a corresponding subset of lines indicating values of forces exerted by the constraints external to the robot corresponding to the indicated displacement.

3. The method for controlling a robot as claimed in claim 1, wherein a position corresponding to the determined trajectory of an effecter point is subtracted from a position of the effecter point determined by interpolation, associated with respective interpolation coefficients, of a position of a set of said nodes to obtain a subset of lines of the vector δ(x) relative to the effecter point, and wherein, in said same subset of lines of the Jacobean matrix J, values in columns which correspond to said nodes are a function of said interpolation coefficients.

4. The method for controlling a robot as claimed in claim 1, wherein a fixing point of an actuator is an interpolation of nodes each associated with a non-zero interpolation coefficient, and at least one line of the matrix J is determined as a function of a direction of actuation of the actuator, each term of said line being zero apart from those on columns of said node or of said nodes.

5. The method for controlling a robot as claimed in claim 1, wherein, on an $i^{th}$ control computation step:
   Δx that bears out: $-K \cdot \Delta x = p + f(x_{i-1})$ is determined, where Δx represents a variation of the vector x, a vector p represents external forces being exerted on the robot, K is the matrix updated in the step i/, $x_{i-1}$ is a current position vector of the nodes and $f(x_{i-1})$ is a vector of internal forces being exerted on the robot in its current position;
   $x_{free} = x_{i-1} + \Delta x$ is computed;
   values of a vector $\delta(x_{free})$ are computed; and
   the equation $\delta = W \cdot \lambda + \delta_0$ is solved in the step iv, by taking $\delta_0$ to be equal to $\delta(x_{free})$.

6. The method for controlling a robot as claimed in claim 1, wherein, in the step iii/, the equation $\delta = W \cdot \lambda + \delta_0$ is solved by an iterative algorithm of Gauss-Seidel type, incorporating at least one of constraints linked to directions of actuation, constraints linked to limit stop limits, constraints linked to a maximum load exerted by at least one actuator, or characteristics of constraints external to the robot.

7. A computer program for controlling a robot comprising at least one part that can be deformed by a set of actuators, each point of a set of points, called effecter points of the robot, having to follow a determined trajectory, the robot being defined by a model of nodes and a matrix K defining a variation of internal forces of the robot at each node as a function of a variation of position of the nodes, said program comprising instructions for implementing the steps of a method as claimed in claim 1 upon an execution of the program by processing means, to determine a control intended for each actuator on an $i^{th}$ control computation step.

8. A module for controlling a robot comprising at least one part that can be deformed by a set of actuators, each point of a set of points, called effecter points of the robot, having to follow a determined trajectory, the robot being defined by a model of nodes and a matrix K defining a variation of internal forces of the robot at each node as a function of a variation of position of the nodes, the control module being characterized in that it is adapted, upon a determination of a control intended for each actuator on an $i^{th}$ control computation step, to update values of the matrix K as a function of a current position of the nodes of the robot, then to determine current values of a Jacobean matrix J of a vector $\delta(x)$, where x is a position vector of the nodes and the vector $\delta(x)$ includes at least one subset of lines relative to each effecter point and indicating coordinates of deviations between a position of said effecter point and its determined trajectory, and at least one subset of lines indicating a displacement of each actuator;

said control module being adapted to compute values of a matrix $W=J \cdot K^{-1} \cdot J^T$, where $K^{-1}$ is an inverse matrix of K and $J^T$ is a transposed matrix of J, and to solve an equation $\delta = W \cdot \lambda + \delta_0$, by determining values of the vectors $\delta$ and $\lambda$ at said $i^{th}$ computation step, where $\lambda$ is a vector including, for each line of the vector $\delta$ relative to an effecter point, a line including a zero value and, for each line of the vector $\delta$ relative to an actuator, a line including a value of load exerted by the actuator corresponding to an indicated displacement, and $\delta_0$ is a vector including determined values; and said control module being adapted to deduce a control intended for each actuator as a function at least of said determined values of the vector $\delta$ or $\lambda$.

9. The module for controlling a robot as claimed in claim 8, adapted to determine a vector $\delta$ further including at least one subset of lines indicating a displacement of a point of the robot subject to constraints external to the robot, and a vector $\lambda$ further including a corresponding subset of lines indicating values of forces exerted by the constraints external to the robot corresponding to the indicated displacement.

10. The module for controlling a robot as claimed in claim 8, adapted to subtract a position corresponding to the determined trajectory of an effecter point from a position of the effecter point determined by interpolation, associated with respective interpolation coefficients, of a position of a set of said nodes to obtain a subset of lines of the vector $\delta(x)$ relative to the effecter point, and adapted to determine, in said same subset of lines of the Jacobean matrix J, values in columns which correspond to said nodes, as a function of said interpolation coefficients.

11. The module for controlling a robot as claimed in claim 8, adapted to determine a fixing point of an actuator as an interpolation of nodes each associated with a non-zero interpolation coefficient, and to determine at least one line of the matrix J as a function of a direction of actuation of said actuator, each term of said line being zero apart from those on columns of said node or of said nodes.

12. The module for controlling a robot as claimed in claim 8, adapted to, on $i^{th}$ an control computation step, determine $\Delta x$ bearing out: $-K \cdot \Delta x = p + f(x_{i-1})$, where $\Delta x$ represents a variation of the vector x, a vector p represents external forces being exerted on the robot, K is the updated matrix, $x_{i-1}$ is a current position vector of the nodes and $f(x-1)$ is a vector of internal forces being exerted on the robot in its current position;

said module being adapted to compute $x_{free} = x_{i-1} + \Delta x$, then to compute values of a vector $\delta(x_{free})$; and to solve the equation $\delta = W \cdot \lambda + \delta_0$ by taking $\delta_0$ to be equal to $\delta(x_{free})$.

13. The module for controlling a robot as claimed in claim 8, adapted to solve the equation $\delta = W \cdot \lambda + \delta_0$ by an iterative algorithm of Gauss-Seidel type, by incorporating therein at least one of constraints linked to directions of actuation, constraints linked to limit stop limits, constraints linked to a maximum load of at least one actuator, or characteristics of constraints external to the robot.

* * * * *